Oct. 6, 1970　　　　J. M. COOGAN　　　　3,532,428
METHOD OF PLANETARY ATMOSPHERIC INVESTIGATION USING
A SPLIT-TRAJECTORY DUAL FLYBY MODE
Filed Dec. 15, 1967　　　　　　　　　　　　4 Sheets-Sheet 1

INVENTOR.
JOHN M. COOGAN
BY
ATTORNEYS

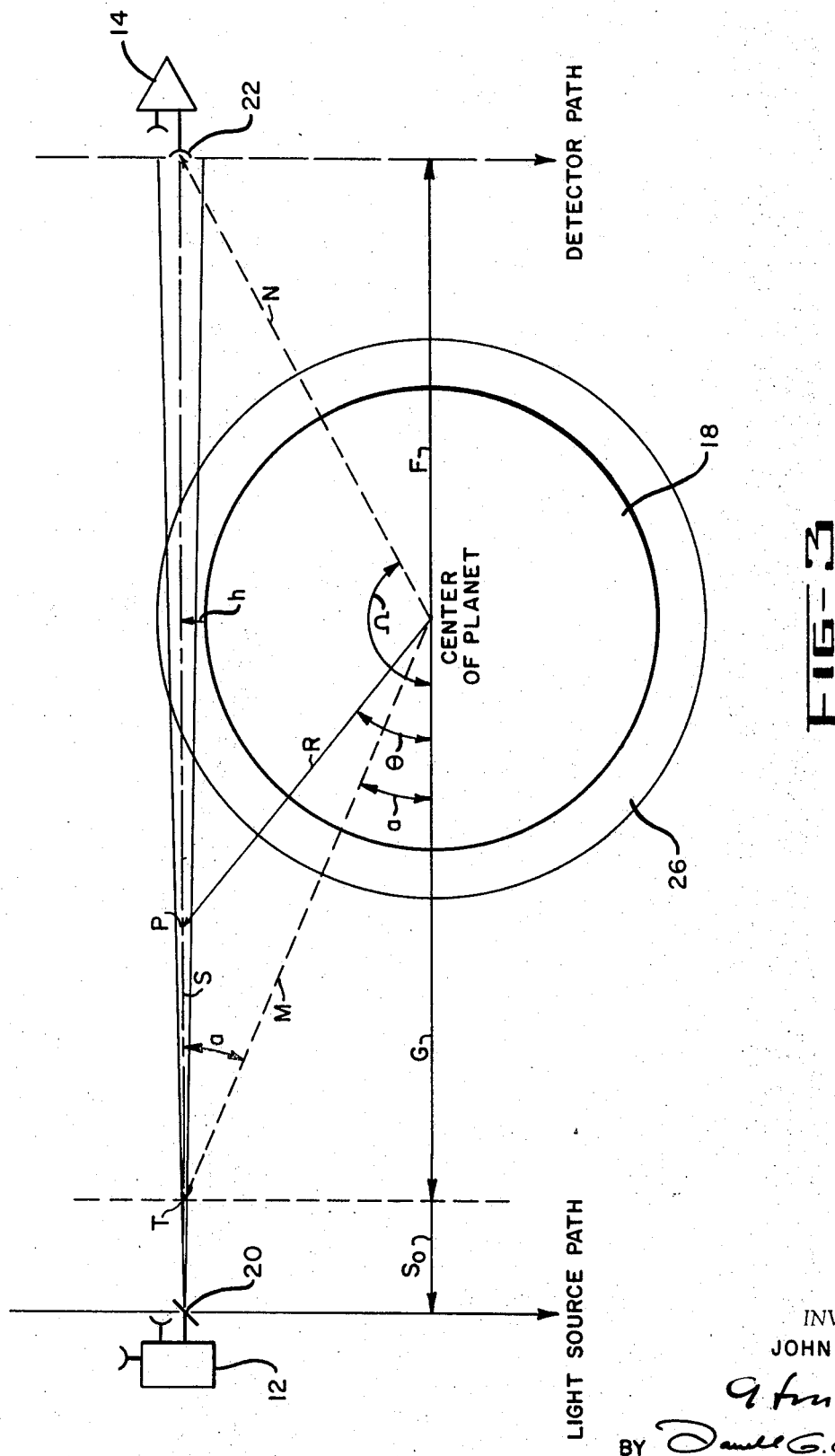

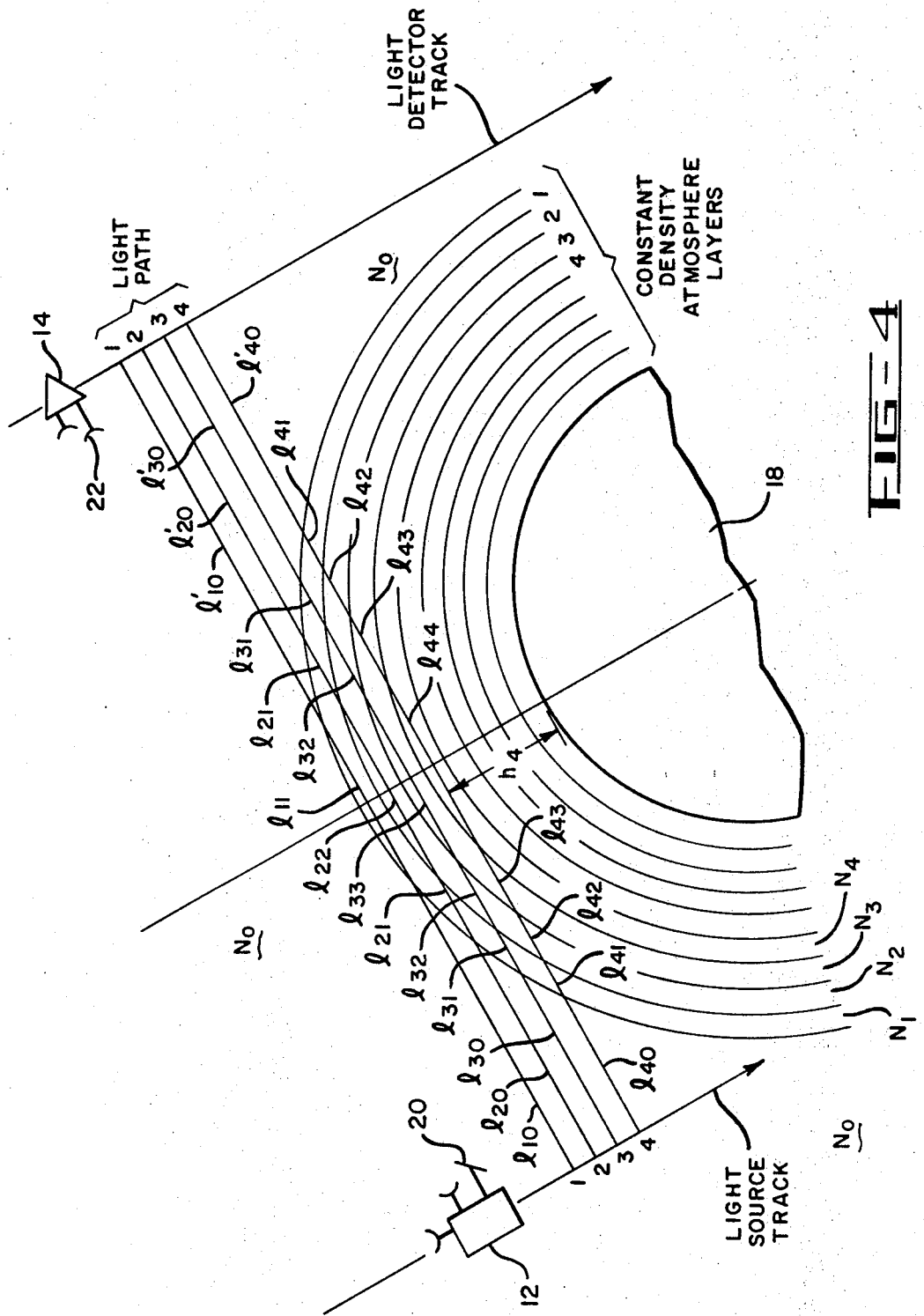

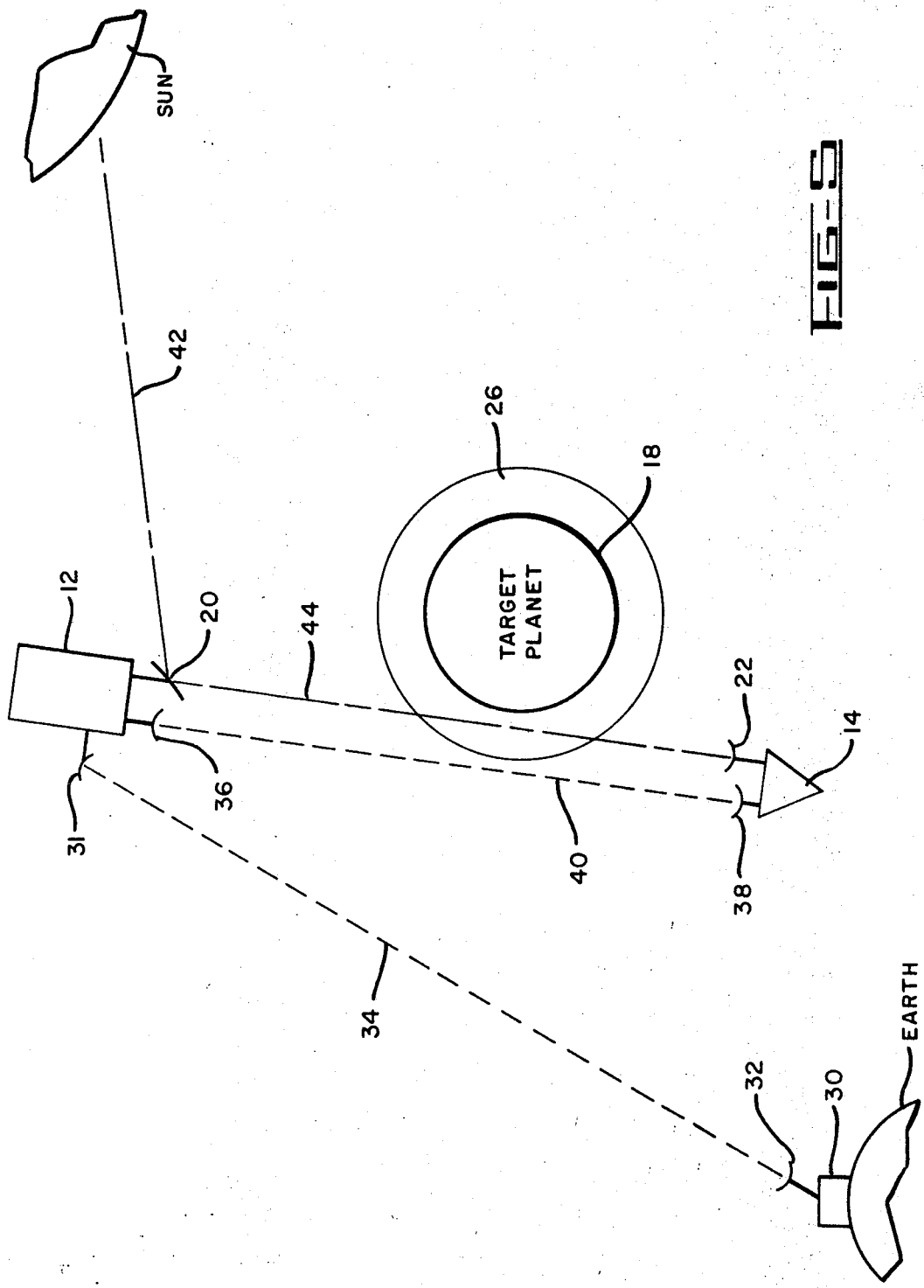

United States Patent Office 3,532,428
Patented Oct. 6, 1970

3,532,428
METHOD OF PLANETARY ATMOSPHERIC INVESTIGATION USING A SPLIT-TRAJECTORY DUAL FLYBY MODE
John M. Coogan, Rockville, Md., assignor to the United States of America as represented by the Administrator of the National Aeronautics and Space Administration
Filed Dec. 15, 1967, Ser. No. 690,998
Int. Cl. G01j 3/00
U.S. Cl. 356—74        13 Claims

ABSTRACT OF THE DISCLOSURE

A method of investigating the atmosphere of a remote target planet comprising launching from Earth a pair of attached instrument platforms on a trajectory toward the target planet. The platforms are separated in space with sufficient thrust that the platforms fly by opposite sides of the planet such that the line of sight between the pair sweeps over a range of planet altitudes. Radiation from one platform is directed onto a radiation detector aboard the other platform to obtain a measure of the absorption of the radiation in travelling between the pair of platforms. From the absorption measurements and knowledge of the position of the pair of platforms relative to the target platform, the constitution and density of the atmosphere may be determined as a function of altitude without entry of the atmosphere and possible biological contamination thereof.

---

The invention described herein was made by an employee of the United States Government and may be manufactured and used by or for the Government for governmental purposes without the payment of any royalties thereon or therefor.

This invention relates to a method for the analysis of the atmosphere of a target planet remote from Earth and more particularly to a method for identifying the gaseous constituents of the atmosphere and determining the density thereof at various altitudes without requiring entry or operation within the target planet atmosphere.

A number of prior art methods for identifying the gaseous constituents and determining how their concentrations vary with altitude suggest themselves to those skilled in this art which methods do not require entry into or operation in the subject atmosphere. For example, one method is to use the sun or a star as a light source and have a single flyby platform carrying the detection apparatus follow a trajectory which permits detecting the sun or star light after it passes through the atmosphere of the planet to analyze the light by absorption spectrophotometry. A disadvantage of such a method resides in the fact that a solar or stellar light source is omnidirectional. Therefore, light may be refracted and/or scattered into the detector, which light has travelled different paths than the light propagated in nearly straight lines from the source to the detector. This leads to difficulty in data analysis and may prohibit calculation of absolute density values of the atmospheric constituents as functions of altitude. Also, mechanically, the detector must locate and lock on the light source prior to and during the sweep of the line of sight through the planetary atmosphere. From a trajectory standpoint, the flyby must follow the track that permits viewing the natural light source through the atmosphere. Such a trajectory would be difficult to obtain.

An object of this invention is the provision of a method for the performance of absorption spectroscopic analysis of the atmosphere of the target planet which avoids the shortcomings of prior art methods and means.

An object of this invention is the provision of methods for the performance of absorption spectroscopic analysis of the atmosphere of a target planet for identification of the gaseous constituents of the atmosphere and the determination of the concentration thereof with altitude, without requiring entry or operation in the atmosphere.

The above and other objects and advantages of the invention are obtained by launching a substantially conventional planetary flyby vehicle or platform for flyby past the planet whose atmosphere is under consideration. This main vehicle would, in accordance with this invention, carry a piggyback flyby platform, vehicle or capsule which piggyback vehicle is launched with proper timing and thrust such that it also flies by the planet but on the side opposite the main vehicle such that the line of sight between the main and piggyback vehicles sweeps over a range of planet altitudes. One of the vehicles carries a radiation source, either an artificial source or a solar mirror, and the other vehicle carries a compatible spectrophotometer or detector system. The light source and the detector system are pointed or directed at each other and the transmittance measurements are performed at the wavelengths of interest. The main flyby vehicle is tracked from Earth, and its altitude from the target planet surface is continuously determined as by an onboard height-finder. The piggyback flyby vehicle location and trajectory are determined by tracking it from the main flyby vehicle. With the location data and the transmittance measurements, transmittance (or absorption) versus altitude information may be determined, from which the constituents of the atmosphere can be identified and their concentrations as a function of altitude may be determined.

The invention will be better understood from the following description considered in conjunction with the drawings and from the appended claims. In the drawings wherein like reference characters refer to the same parts in several views:

FIG. 1 is a diagrammatic view of a space vehicle, a separable space capsule, and a rocket engine for launching the same from Earth;

FIGS 2A through 2D diagrammatically show in sequence the relative positions of a target planet, the main flyby vehicle and piggyback flyby vehicle at different times in the flyby process;

FIG. 3 is a diagrammatic illustration of the geometry of the flyby showing the variation in density of the atmosphere along the line of sight between the main flyby vehicle and piggyback vehicle;

FIG. 4 is a schematic diagram which is similar to that of FIG. 3 but showing a plurality of constant density atmosphere layers about the target planet and showing a plurality of radiation paths as the main and capsule vehicles fly by the planet; and FIG. 5 is a diagrammatic view showing the relative position of the sun and flyby vehicles during the measurement operations.

Figure 1:
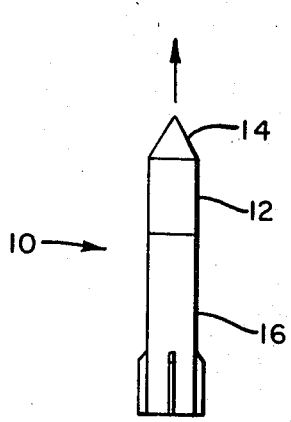

Reference is first made to FIG. 1 wherein there is diagrammatically shown a space vehicle 10 comprising a main flyby spacecraft 12 with a piggyback capsule 14 releasably attached thereto. The vehicle is projected into space by a suitable rocket engine 16 on a trajectory to fly by the target planet, such as Mars, Venus, or the like, for examination of the planetary atmosphere by absorption spectrophotometric means.

Figure 2:
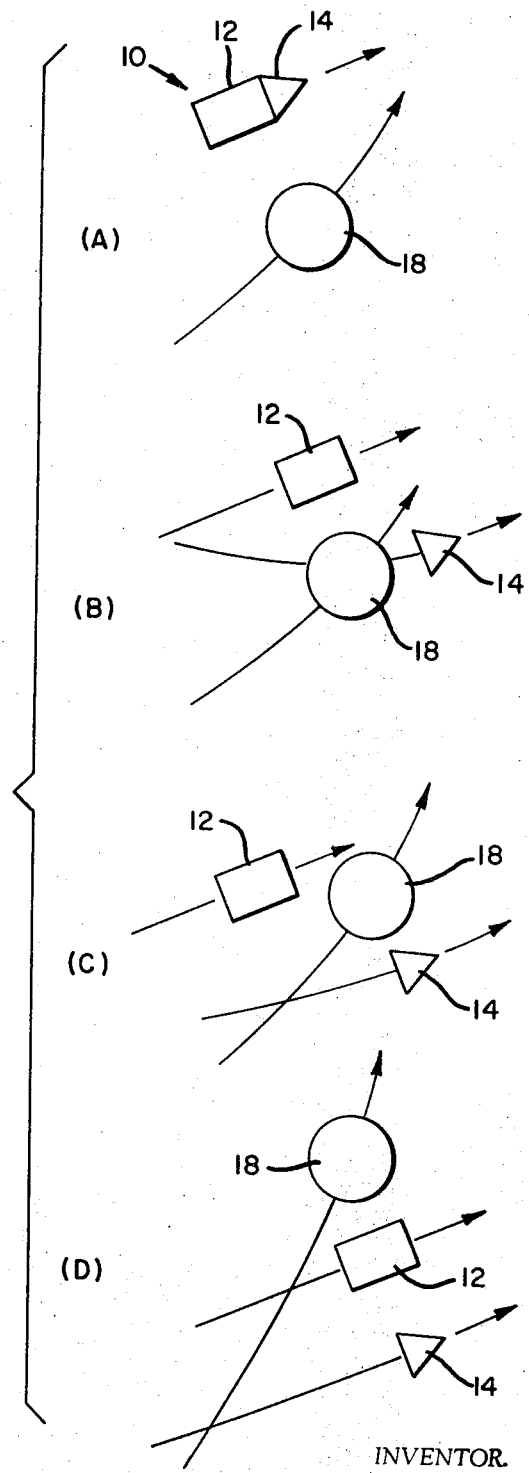

In FIGS. 2A–2D the relative positions of the target planet, designated 18, and the main flyby spacecraft 12 and piggyback flyby capsule 14 at different times during the encounter process are shown. Thus, in FIG. 2A the space vehicle 10 (without the booster engine 16 which has been ejected during the initial portion of the flight) is shown in transit to the planet 18. At the appropriate time during flight the piggyback capsule 14 is launched from its main spacecraft 12 as illustrated in FIG. 2B. The capsule 14 follows a hyperbolic trajectory around the side of the target planet 18 opposite to that of the main vehicle 12 as shown in FIG. 2C to provide a split-trajectory dual flyby mode. In this mode, the two spacecraft 12 and 14 fly by the target planet 18 so that the line of sight between them sweeps through the atmosphere over a range of altitudes. It is during this mode that the atmospheric gases of the planet 18 are analyzed by absorption spectrophotometry. Termination of the flyby mode is illustrated in FIG. 2D.

A suitable split-trajectory can be achieved with a small velocity increment. For example, to place a 50 kg. piggyback capsule in an 1800 km. closest approach flyby of a target planet such as Mars, a 3.3 kg. solid fuel propulsion unit with a specific impulse of 250 seconds would be required, if separation several days before encounter is desired. Earlier separation could be accomplished with as simple and reliable a device as a spring. The earlier separation the less separation energy required, but the more stringent the guidance and control requirements become. It is known that because of physical optics considerations (i.e., refraction effects) measured intensity variations cannot be attributed to spectral absorption until the detector is within the order of a planetary radius from the planets surface. Consequently, the flyby carrying the detector must have a trajectory within the useful range.

To perform the absorption spectroscopic measurements of the atmosphere of the planet 18 one of the flybys (i.e., either the spacecraft 12 or capsule 14) carries a highly directional radiation source such as a plane solar mirror which provides a source of light, and the other flyby carries a radiation detector for detecting radiation from the source. In the arrangement depicted in FIG. 3 the spacecraft 12 carries a plane solar mirror 20 as a light source and the capsule 14 carries a detector system which includes a collector 22. The detector system may comprise a complete spectrometer with prisms or a grating, and either mechanical scanning into a photoelectric detector or dispersion over a film or television camera tube to provide analysis over a wide wavelength range. Alternatively, a spectrally selective detector system may be used, such as a gas filled ion chamber with cut-off filter in the vacuum ultraviolet, or, for the infrared, a simple solid state detector with a narrow bandwidth filter. As a further alternative, multiple filter and detector combinations may be used for analysis of a plurality of selected wavelengths. As is well understood, a given gaseous constituent of the atmosphere of the target planet may have a plurality of absorption bands, and different gases have different absorption bands. Thus, if the constituents are known or suspected, particularly absorption wavelengths may be selected for analysis. For example, the atmosphere of Mars is known to include $CO_2$ and possibly $N_2$ or A and is suspected of including $N_2+$, $N+$, electrons and N-oxides. Therefore, wavelengths within the absorption bands of the above-listed constituents would be employed in the detecting system. In any event, the measurements are made at the desired wavelength, or wavelengths, which are of must use.

An expression for the variation in the intensity of light of one wavelength by absorption by a constituent of the planet's atmosphere as the spacecraft fly by the planet is developed with reference to FIG. 4, to which figure reference is now made. The planet 18 is shown with an atmosphere 26, and the flyby paths of the spacecraft 12 (with the light source 20) and capsule 14 (with the detector which includes the collector 22) are depicted therein.

Beer's law states that:

$$\frac{dI}{I} = \sigma N dS \qquad (1)$$

where,

I is the intensity of electromagnetic energy of wavelength $\lambda$, propagating in spherical or plane waves, S is the distance between the light source and detector along a path which includes active absorbers, $\sigma$ is the absorption cross-section of the active absorbers in a medium of constant density $\rho$, and N is the number of absorbers per cm.$^3$.

From Beer's law, the intensity I of the energy after traversing a distance S through a medium of active absorbers of absorption cross-section $\sigma$ and constant density $\rho$ is $$I = I_0 \left(\frac{S_0}{S}\right)^2 e^{-S\sigma N} \qquad (2)$$

where;

$I_0$ is a reference intensity calculated at some distance $S_0$ from the apparent or real source of light, $e$ is the base of natural logarithms, and the number of absorbers per cm.$^3$ is, $$N = \rho \frac{N_A}{M} \qquad (3)$$

where;

$N_A$ is Avogadro's constant, and

M is the molecular weight of the absorber.

When a plane solar mirror 20 is used as the light source, as shown in the drawings, the sunlight reflected from the mirror appears to originate from a point a comparatively short distance $S_0$ behind the mirror since the Sun is not a point source. In the vicinity of Mars, for a 1 meter diameter plane mirror, $S_0 = 0.164$ km. At 4.3$\mu$, $I_0$ is then 2800 ergs/cm.$^2$ $\mu$sec.

In FIG. 3, it is assumed that the density of the atmosphere 26 is spherically symmetrical that is, $\rho$ is a function only of R. In terms of the notation of FIG. 3, the intensity of light reaching the collector 22 for any light path, defined by the perpendicular closest distance $h$ to the planet's surface is $$I = I_0 \left(\frac{S_0}{S}\right)^2 e^{-\frac{\sigma N_A (h+Q)}{M} \int_\alpha^\Omega \rho \frac{d\theta}{\sin^2 \theta}} \qquad (4)$$

where;

Q is the radius of the planet 18, $\rho$ is a function of R, and $$R = \frac{h+Q}{\sin \theta} \qquad (5)$$

It will be seen that $\rho$ is a function of $\theta$ for a given perpendicular closest distance $h$.

The trajectories of the crafts 12 and 14 are known and of $I/I_0$-altitude profile is determined from the known trajectories and the measured value of I versus altitude for a plurality of points as the planet is passed.

The measurement of intensity I, and trajectory information available at the flybys 12 and 14 are relayed to a ground station 30 shown in FIG. 5. There, an $I/I_0$ altitude profile is determined from the known trajectories of the dual flybys and the measured value of I versus altitude for a plurality of points as the planet is passed.

The experimentally determined $I/I_0$ altitude profiles are then used to derive an absolute density-altitude profile for each constituent under investigation.

An approximation form of Equation 4, in which the atmosphere is divided into concentric spherical shells each having a constant density, can be used to express N as $$N_i = \frac{1}{\sigma l_{ii}} \ln\left[\left(\frac{S_i}{S_0}\right)^2 \left(\frac{I}{I_0}\right)_i\right] - \frac{N_0(l_{i0} + l'_{i0})}{l_{ii}}$$
$$- \frac{2N_1 l_{i1}}{l_{ii}} - \frac{2N_2 l_{i2}}{l_{ii}} - \frac{2N_3 l_{i3}}{l_{ii}} \cdots - \frac{2N_{i-1} l_{i-1}}{l_{ii}} \qquad (6)$$

where $N_1$, $N_2$, $N_{i-1}$ are determined by applying values of $(I/I_0)_1$, $(I/I_0)_2$, etc. (which were measured at higher altitudes) in previous calculations with Equation 6. The 1 values are as defined in FIG. 4, wherein the planet's atmosphere is shown divided in concentric spherical shells of constant density.

Detailed manipulations of the expression for $N_i$ and $N_{i-1}$ show that $N_i$ depends upon the fractional difference between natural logrithmic functions of the $(I/I_0)_i$ and $(I/I_0)_{i-1}$ measurements. Also, $N_i$ depends upon absorption path lengths. Because of this dependency on the differences between terms the $N_o$ term can be neglected with little effect.

When a solar mirror 20 is used as the light source the spacecraft 12 with the mirror must, of course, be illuminated by the Sun, such as depicted in FIG. 5. Also, to reduce background light viewed by the detector aboard the capsule 14, flyby of the detector is on the night side of the planet. In addition, the collector 22 preferably is oriented to exclude from its field of view brighter stars and planets which may be observable during the measurement period. The general starlight background is well below a level which would interfere with the measurements.

To analyze and relate the results of the absorption measurements to a density-altitude profile, it is necessary to know the locations of the two instrument platforms 12 and 14 and the altitude of their line of sight from the panet's surface. As mentioned above, time location data of the vehicle 12 may be provided by conventional apparatus such as the Deep Space Instrumentation Facility (DSIF) of the California Institute of Technology's Jet Propulsion Laboratory which has provided data in time location history of planetary mission spacecraft. In one arrangement, the spacecraft 12 carries an antenna 31 and associated transponder which is interrogated by a synchronizing signal from the ground station 30 included in the DSIF. With an 85 ft. dish tracking antenna 32, Doppler shifts, and transmit times, pointing accuracies of 0.01 to 0.02° are obtainable. Worse case estimates of ranging errors are 15 meters. By plotting the trajectory of the spacecraft 12 before and after the spacecraft passes behind the planet 18, and using an iterative process to account for the gravitational field, the complete trajectory of the spacecraft is accurately obtained. An Earth-spacecraft link is simply identified by a broken line designated 34.

The piggyback capsule 14 could be directly tracked from Earth in the same manner as the main spacecraft 12 if desired. However, for simpicity and to minimize weight and power requirements aboard the capsule, the capsule 14 may be tracked from the main spacecraft 12. A simple transponder system with steerable antennas 36 and 38 may be employed, for data transfer, tracking and pointing requirements. The link between the antennas 36 and 38 is shown by a broken line 40 therebetween.

The illustrated light source 20 and collector 22 are directional and must be pointed at each other during the traverse of their line of sight through the targets' atmosphere. Consequently, the illustrated arrangement includes pointing means not shown, of any suitable design for pointing the mirror and collector at each other. In FIG. 5 the mirror 20 is shown oriented to reflect rays from the Sun along path 42 onto the collector 22 along path 44. All of the tracking, pointing, detecting and data acquisition conversion, manipulation, storage and transmission systems employed may be of conventional design.

The dual flyby spectrophotometry method avoids the constraints of entry probe biological sterilization, entry heating protective devices, and contamination of experiments with ablation products of the heat shield. Problems due to multiple scattering and scattering surface reflection combinations are substantially avoided and absolute density-altitude profiles are obtained with the novel method of this invention.

The invention having been described in detail in accordance with the requirements of the Patent Statutes, various changes and modifications may suggest themselves to those skilled in this art. For example, although a solar mirror is shown as the highly directional light source, other sources may be used. Particularly, if the flybys penetrated the atmosphere of the planet, a self-energized source would be desirable. For example, arc discharge lamps and lasers could be employed. In a modified arrangement, the detector system including the collector 22 may be mounted on the main spacecraft 12, and a corner reflector may be used on the capsule 14 in place thereof. With this arrangement the light intensity is subjected to a second inverse distance squared loss. However, the requirement of an accurate pointing system on the capsule would be eliminated thereby simplifying the system carried by the capsule. Another alternative, as mentioned above, is the use of a plurality of collectors 22 and associated detectors at the capsule all of which are aligned and carried by the same pointing mount.

Other alternatives include the use of more than one piggyback flyby capsule on the main spacecraft whereby measurements over different regions of the planet is possible. Also, the parent spacecraft could serve as a direct entry probe or lander. In this case, prior to entry of the parent into the atmosphere two or more piggyback capsules would be launched therefrom for travel by the planet in different planes. The piggyback capsules would carry the same apparatus as the spacecraft 12 and capsule 14 for performance of the absorption spectroscopy measurements detailed above.

The geometry of the split-trajectory dual flyby mode allows for additional observations which are not ordinarily possible. For example, simultaneous sunlit and dark side coverage is possible, permitting a one-time observation of diurnal variation in various phenomena of interest. Thus, emission spectroscopy could be employed to search for day and night glows which may identify particular constituents and give clues about particular dissociation and recombination processes. This could be done before and after the atmospheric absorption spectrometry experiment, using extended wavelength versions of the same equipment. Similarly, infrared surveys of surface and cloud, if any, and day and night temperature measurements could be made. Solar effects and deviations from symmetry due to characteristics of the planet both may be seen during simultaneous observations from both sides of the planet of the interaction of the planet's magnetic field and the flow of solar protons. Asymmerties in the magnetic field, micro-meteorite distribution, trapped particle regions, if any, and ionosphere geometry and density (as seen from a topside sounder) are all potentially observable with the split trajectory flybys.

I claim:
1. A method of obtaining information concerning a target planet comprising,
   Launching from the Earth a pair of attached instrument platforms on a trajectory toward the target planet,
   separating in space one instrument platform from the other platform such that the platforms fly by opposite sides of the target planet,
   directing radiation from a light source carried on one platform to a radiation detector carried on the other platform, and
   performing measurements with apparatus aboard the platforms as they fly by the target planet.
2. The method as defined in claim 1 wherein the platforms carry apparatus for performing absorption spectrophotometric measurements of the target planet's atmosphere as the line of sight between the platforms sweeps through the planetary atmosphere.
3. The method as defined in claim 2 including, determining the density of absorbing constituents in the atmosphere from the absorption measurements.
4. The method as defined in claim 1 wherein one platform of the pair of instrument platforms comprises a main spacecraft, and the other platform of the pair comprises a piggyback capsule.

5. A method of performing absorption spectroscopy measurements of the atmosphere of the planet comprising,
   directing a pair of instrument platforms past a planet such that the line of sight between the pair sweeps over a range of planet altitudes, and
   directing radiation from one of said platforms onto a radiation detector aboard the other of said platforms to obtain a measure of the absorption of the radiation in travelling between the pair of platforms.

6. The absorption spectroscopy method as defined in claim 5 including, obtaining from the absorption measurements and knowledge of the position of the pair of platforms relative to the planet, absorption versus altitude values at a desired wavelength as the line of sight sweeps through the planetary atmosphere.

7. The absorption spectroscopy method as defined in claim 6 including, determining values of density of absorbing constituents in the atmosphere of the planet versus altitude from the absorption versus altitude values.

8. A method of determining the density of atmospheric constituents of a planet comprising,
   directing a pair of spacecraft past a planet such that the line of sight between the pair sweeps over a range of planet altitudes,
   directing radiation from one of said spacecraft onto a radiation detector aboard the other of said spacecraft,
   obtaining from the radiation detector and knowledge of the position of the pair of spacecraft relative to the planet absorption versus altitude measurements at a desired wavelength as the line of sight sweeps through the planetary atmosphere, and
   determining the density of absorbing constituents in the atmosphere of the planet versus altitude from the absorption versus altitude measurements.

9. The method of determining the density of atmospheric constituents of a planet as defined in claim 8 wherein,
   one of said spacecraft comprises a main flyby spacecraft and the other of said spacecraft comprises a capsule carried piggyback by said main spacecraft,
   the spacecraft being directed past the planet by launching the main spacecraft with the piggyback capsule attached thereto from the earth in a trajectory for flyby mode of the main spacecraft past the planet whose atmosphere is under consideration, and
   launching the piggyback capsule from the main spacecraft flyby with sufficient thrust and in the proper direction such that the capsule follows a hyperbolic trajectory around the side of the target planet opposite that followed by the main spacecraft.

10. The method of determining the density of atmospheric constituents of a planet as defined in claim 8 wherein, said step of directing radiation from the one spacecraft comprises reflecting sunlight from the sun onto the radiation detector aboard the piggyback capsule.

11. The method as defined in claim 8 wherein the radiation detector comprises a spectrometer for analyzing a broad section of the spectrum of radiation directed thereto from the one spacecraft.

12. The method of determining the density of atmospheric constituents of a planet that is defined in claim 8 wherein, said radiation detector comprises a spectrally selective detector for analysis of a narrow section of the spectrum of radiation directed thereto from the one spacecraft.

13. A method of determining the constitution and density of the atmosphere of a planet as a function of altitude without entry of the atmosphere and possible biological contamination thereof comprising
   directing a pair of instrument platforms past a planet such that the line of sight between the pair sweeps over a range of planet altitudes, and
   directing radiation from one of said platforms onto a radiation detector aboard the other of said platforms to obtain a measure of the absorption of the radiation in travelling between the pair of platforms.

References Cited

UNITED STATES PATENTS

| | | | |
|---|---|---|---|
| 3,381,135 | 4/1968 | Keller | 356—89 |
| 3,447,876 | 6/1969 | Barringer | 356—74 |
| 3,454,338 | 7/1969 | Girard et al. | 356—97 |

RONALD L. WILBERT, Primary Examiner

V. P. McGRAW, Assistant Examiner

U.S. Cl. X.R.
250—43.5, 226